(12) United States Patent
Oelsner

(10) Patent No.: US 7,950,063 B2
(45) Date of Patent: May 24, 2011

(54) DIAGNOSIS SYSTEM WITH IDENTIFICATION DISPLAY DEVICE

(75) Inventor: Tom Oelsner, Frankfurt am Main (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 1702 days.

(21) Appl. No.: 11/122,813

(22) Filed: May 4, 2005

(65) Prior Publication Data

US 2005/0251685 A1 Nov. 10, 2005

(30) Foreign Application Priority Data

May 4, 2004 (DE) .......................... 10 2004 022 215

(51) Int. Cl.
*G06F 21/22* (2006.01)
*G06F 21/20* (2006.01)
(52) U.S. Cl. ........................................... 726/28; 726/30
(58) Field of Classification Search .................. 726/6, 27
See application file for complete search history.

(56) References Cited

U.S. PATENT DOCUMENTS

| 5,742,759 | A * | 4/1998 | Nessett et al. ..................... 726/4 |
| 6,182,221 | B1 | 1/2001 | Hsu et al. |
| 6,325,540 | B1 | 12/2001 | Lounsberry et al. |
| 6,697,695 | B1 | 2/2004 | Kurihara et al. |
| 6,795,918 | B1 * | 9/2004 | Trolan ........................ 713/160 |
| 6,795,925 | B2 * | 9/2004 | Colvin ........................... 726/30 |
| 6,981,145 | B1 | 12/2005 | Calvez et al. |
| 7,290,129 | B2 * | 10/2007 | Chebolu et al. ............... 713/150 |
| 2003/0023336 | A1 | 1/2003 | Kreidler et al. |
| 2004/0025047 | A1 * | 2/2004 | Mayne et al. ................. 713/200 |
| 2004/0255004 | A1 | 12/2004 | Weseloh |
| 2004/0260942 | A1 * | 12/2004 | Jamieson et al. ............. 713/201 |

FOREIGN PATENT DOCUMENTS

| DE | 100 57 625 A1 | 5/2001 |
| DE | 101 52 765 A1 | 5/2003 |
| EP | 0 924 657 A2 | 6/1999 |
| EP | 1028568 A1 | 8/2000 |
| JP | 2002043219 A | 2/2002 |
| JP | 103 13 271 A1 | 10/2004 |
| WO | WO03040896 A1 * | 5/2003 |

OTHER PUBLICATIONS

H. Yokota, "Construction Guide to Windows Server 2003", Network Magazine, Japan: ASCII Corporation, Mar. 1, 2004, vo. 9, No. 3, pp. 106-109—Statement of Relevance.

* cited by examiner

*Primary Examiner* — Kambiz Zand
*Assistant Examiner* — Venkat Perungavoor
(74) *Attorney, Agent, or Firm* — Laurence A. Greenberg; Werner H. Stemer; Ralph E. Locher

(57) ABSTRACT

An electronic system provides secure and authorized access to data or a user interface on at least one first computer for operating machines from at least one second computer. The data or the user interface on the first computer can be accessed exclusively from the second computer, in that the second computer has an authorization device which stores the access data for personnel with access authorization, and in that access to the data or the user interface on the first computer is preceded by a display apparatus connected to the first computer showing a display which reveals the identified personnel with access authorization from the second computer.

13 Claims, 1 Drawing Sheet

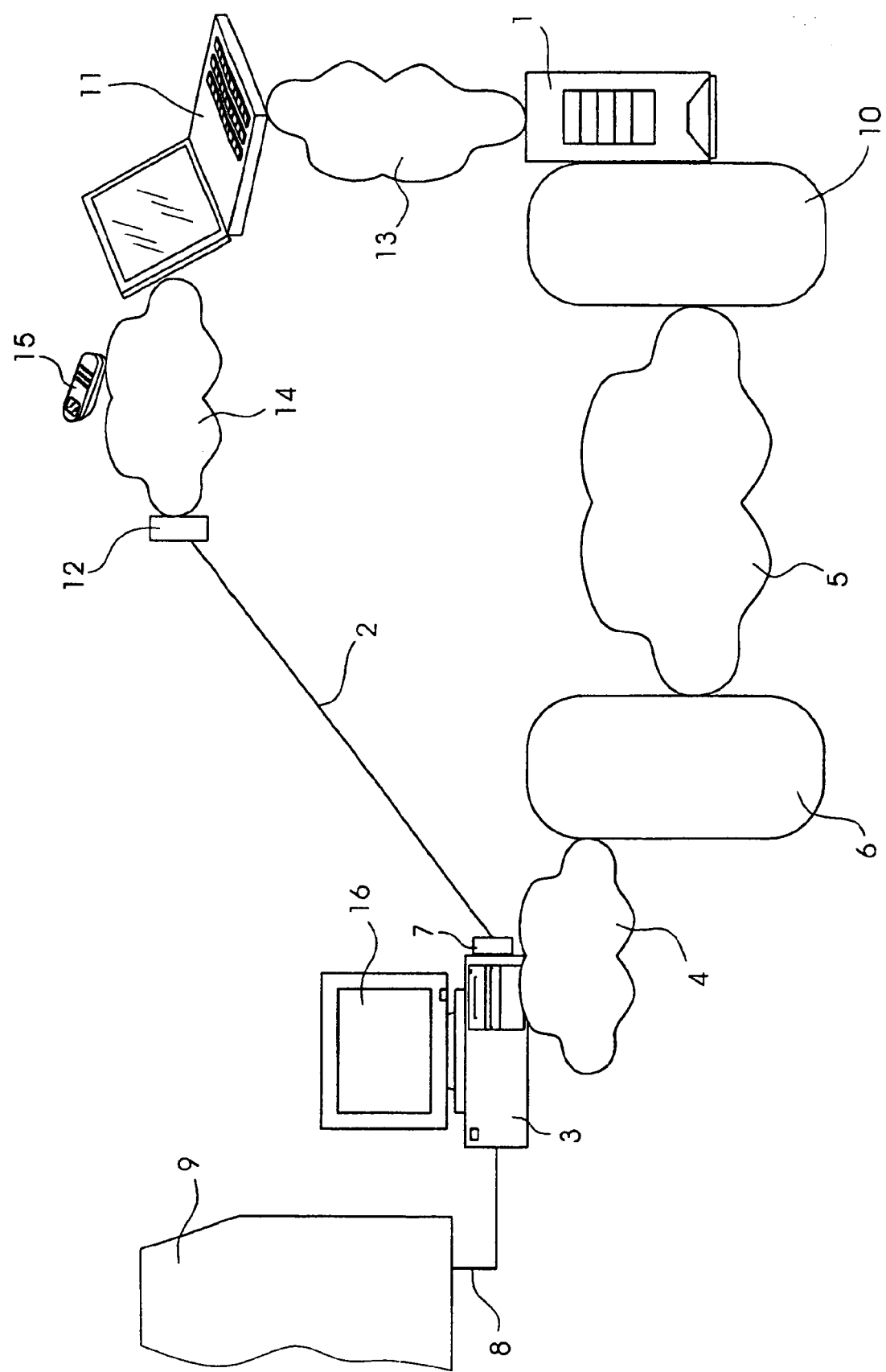

DIAGNOSIS SYSTEM WITH IDENTIFICATION DISPLAY DEVICE

PRIORITY

This application claims the priority, under 35 U.S.C. §119, of German patent application No. 10 2004 022 215.0, filed May 4, 2004; the entire disclosure of the prior application is herewith incorporated by reference.

BACKGROUND OF THE INVENTION

Field of the Invention

The present invention relates to an electronic system and a method for providing secure and authorized access to data or a user interface on at least one first computer for operating machines from at least one second computer.

Processing machines in industry need to be continually serviced and checked in order to minimize down times as a result of wear and other defects. It is also possible, with modern processing machines, to connect the control computer for the machines to a servicing computer belonging to the manufacturer of the machine via the Internet and an intranet, in order to check the data on the industrial machine on a continuous basis and possibly to perform servicing work on the processing machine via the Internet and the intranet. In this case, the servicing personnel do not need to appear in person in the company of the operator of the industrial machine, but rather can perform "remote servicing" and "remote diagnosis" on the machine.

Such a system is known from published, non-prosecuted German patent application DE 101 52 765 A1 (corresponding to U.S. Patent Disclosure 2003/0023336 A1), which is used for computer-aided handling and management of a numerically controlled industrial processing machine. In this case, the processing machine has a machine operating computer, which is connected to a main computer at the premises of the manufacturer or servicing company via a data communication connection such as the Internet. The main computer is able to retrieve machine state data from the operating computer for the processing machine in real time, to transmit them to the main computer and then to perform analysis and evaluation on the main computer. It is then possible for data to be returned to the machine operating computer again in order to solve any problems, since the requested machine state data can be used to reveal, by way of example, any problems which arise on the numerically controlled industrial processing machine in good time and to initiate appropriate countermeasures early. Furthermore, the machine state data can be evaluated such that improved machine data are made available to the processing machine by the main computer.

In such a system, the identification and authorization of the 7 servicing personnel plays a crucial role, since no operator of the processing machine can accept a situation in which unauthorized parties access its processing machine computer. It is therefore absolutely necessary to ensure that the processing machine computer can actually be accessed only by the manufacturer or by the servicing company, which is responsible for the processing machine. Since the processing machine computer and the main computer at the manufacturer usually communicate with one another via an Internet connection, the communication has all the associated risks known from the Internet. To minimize these risks, it is known in the prior art to encrypt the connection between the processing machine computer and the main computer or to allow only particular computers to access the processing machine computer.

Many operators of processing machines would also like to have a permanent contact at the premises of the manufacturer or servicing company for their machine, since they wish to play it safe in ensuring that their machine is serviced only by particular people with whom they are familiar.

SUMMARY OF THE INVENTION

It is accordingly an object of the invention to provide a diagnosis system with an identification display device which overcomes the above-mentioned disadvantages of the prior art devices of this general type, which avoids anonymous access by servicing personnel to data or the user interface on the computer of a processing machine in order to increase acceptance by remote-servicing and remote-diagnosis customers. With the foregoing and other objects in view there is provided, in accordance with the invention, an electronic system for secure and authorized access to data or a user interface. The electronic system contains at least one first computer for operating a machine and having the user interface, a display apparatus connected to the first computer, and at least one second computer connected to the first computer. The data or the user interface connected to the first computer is accessed exclusively from the second computer, the second computer has an authorization device storing access data for personnel with access authorization, and that access to the data or the user interface on the first computer is preceded by the display apparatus connected to the first computer showing a display revealing the personnel and the access authorization provided from the second computer.

In the case of the system based on the invention, the operator machine has at least one first computer associated it, the computer being able to use a network connection to communicate with at least one second computer at the premises of the manufacturer or a servicing and maintenance company. Such a communication connection can be set up via the Internet, for example, with such a connection needing to exist only when data actually need to be transmitted from the first computer to the second computer and vice versa. In principle, it is only possible to activate the setup of the connection via the Internet between the first computer and the second computer from the first computer, since the computer is protected from the Internet by a "firewall", a piece of security software which monitors the data traffic from the Internet and prevents, in particular, unauthorized external access to the first computer. Alternatively, it is possible to start the connection setup from the second computer using a special method that is described at another point in this application. In order to avoid anonymous access to the data on the first computer of the machine in this case, the invention provides for the data or user interface on the first computer to be able to be accessed exclusively from the second computer and not from an unauthorized third computer, for the second computer to have an authorization device which stores the access data for personnel with access authorization, and for access to the data or the user interface on the first computer to be preceded by a display apparatus connected to the first computer showing a display which reveals the identified personnel with access authorization from the second computer.

First, this ensures that the data on the first computer can actually be accessed only by the second computer, i.e. by the computer of the manufacturer or of the servicing company, and in particular only data are transmitted to the selected second computer. Computers belonging to third parties are thus no longer able to access the first computer without authorization, since no data are transmitted to their computers. The second computer thus serves as a filter for access to the first computer, which results in that only people who have been authorized using the second computer are able to access data on the first computer. To this end, the servicing personnel need to log onto a further computer, which is connected to the second computer. By way of example, such an authorization device requests the input of a user name and of an associated password for the corresponding operating personnel. The data can be used for clearly identifying the accessing personnel and hence to avoid anonymous access. The data from the servicing personnel identified in this manner can then be displayed on a display apparatus, such as a screen belonging to the first computer, so that the operator of the machine can clearly see on the screen which person is now actually wanting to access the data on his machine.

In one refinement of the invention, a passport picture clearly associated with the respective identified personnel is displayed on the display apparatus of the computer upon identification. Besides or instead of personal data such as the name of the accessing person, the operator of the machine thus obtains a further visual representation of the accessing personnel. Such a representation can be implemented, by way of example, by virtue of the passport picture being part of the access data and being stored on the second computer. Before the data on the first computer are accessed, the picture is then transmitted to the computer together with other identification data. The first computer screen displays the name and a picture of the corresponding servicing personnel. The transmission of such a picture emphasizes the personal contact with the operator of the machine and also reduces unwanted anonymity.

Provision is also made for personal data stored for the operating personnel not to be able to be altered by the personnel themselves. The high demand for security by the operator of the machine results in that it is important for the operator to be able to be certain that the personnel data sent to him, such as the name and the passport picture of the accessing servicing personnel, can also actually be clearly associated with the person who is actually accessing. For this reason, the accessing servicing personnel must also not be able to change their data themselves, since otherwise a gate would be open for manipulation. The operating personnel are merely able to log into the second computer using their user name and their password or using other identification and then to access the data. The servicing personnel have no influence on the display of their personal data on the screen of the first computer, and therefore manipulation by the operating personnel is not possible.

In one particular advantageous refinement of the invention, the operating personnel data can be altered only with administrator access rights. At particular intervals, the data for the operating personnel need to be updated under some circumstances, e.g. when new servicing personnel are employed and are assigned to service the respective machine, or when the data for the servicing personnel have changed for other reasons. The change in the data can be made only by one particular person, however, namely the system administrator on the second computer. This also ensures that the person who changes the operating personnel data is not the same as the operating personnel themselves. This security measure also ensures that it becomes difficult to manipulate the operating personnel data, because the administrator can only be one person, who is then responsible for all changes to the stored data for the servicing personnel alone.

Advantageously, in addition, at least one of the computers has a storage option for the period of data interchange between the computers in order to log the data interchange, which is taking place. In order to provide a way of reconstructing the data interchange if any problems arise or if there are complaints by the operator of the machine, the data interchange can be concomitantly logged either on the first computer or on the second computer or on a further computer. Since the inventive system allows clear identification of the person initiating the data interchange, the logged data can be clearly associated with this person. It is thus possible to tell which person has interchanged which data with which machine at which time and which problems have arisen in this interchange, and if appropriate by whom they were caused. This increases the security both for the operator of the machine and for manufacturer at the servicing company, since the circumstances of the data interchange are easy to reconstruct.

Provision may advantageously also be made for the first computer to have a control element which is used to reject access to the data on the first computer from the second computer. After the personal data have been displayed on the screen of the first computer at the premise of the operator, the operator himself is able to deny access to his computer using a control element. If, by way of example, the operator establishes that a person who is unknown to him or a person who is not authorized to service his machine wishes to access the first computer of his machine, then he can readily recognize this from the clearly associable name and passport picture of this person and can then reject servicing access by the control element. This prevents this person from accessing the data on his computer once. However, this refinement may also be extended by virtue of the operator of the machine preventing the person whom he has rejected from further access to his computer, so that the person whom he has rejected cannot access his computer again in future either. The inventive system and the inventive method meet the requirements of the operator to a high degree in that he is able to determine access to his computer himself and is always able to identify precisely who wishes to access his computer. Nevertheless, it is possible for the servicing personnel to be able to initiate servicing access at all times and not to be tied to fixed servicing intervals.

Other features which are considered as characteristic for the invention are set forth in the appended claims.

Although the invention is illustrated and described herein as embodied in a diagnosis system with an identification display device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is an illustration showing a servicing and diagnosis system with a first computer associated with an operator of a printing machine and two further computers, which are set up for servicing, and associated with the manufacturer of the printing machine.

DESCRIPTION OF THE PREFERRED EMBODIMENTS

Referring now to the single FIGURE of the drawing in detail, there is shown an inventive system used to request data or to access a user interface during servicing and diagnosis of a printing machine 9. The printing machine 9 is connected by a connecting line 8 to a first computer 3 that is situated at the premises of an operator of the printing machine 9. The first computer 3 may simultaneously be a control computer for the printing machine 9, and expediently has a screen 16. In line with the FIGURE, the first computer 3 is able to use a first intranet 4, which is installed within the premises of the operator of the printing machine 9, and the Internet 5 to set up a connection for data transmission to a second computer 1, which is located at the premises of the manufacturer of the printing machine 9. The first computer 3 and the second computer 1 are programmed such that the data on the first computer 3 can be received by only the second computer 1. This serves to prevent unauthorized parties from accessing the data on the first computer 3. Connected to the second computer 1 via a second intranet 13 at the premises of the manufacturer of the printing machine are further computers 11, with which servicing personnel can use for remote servicing of the printing machine 9. Each person authorized for servicing is thus able, following successful identification, to access the data on the first computer 3 using his laptop 11, the second intranet connection 13 and the second computer 1.

In line with the FIGURE, the first intranet 4 is also protected from the Internet 5 by a firewall 6, in order to prevent unauthorized parties from infiltrating the first intranet 4 associated with the operator of the printing machine 9. Since the firewall 6 would also, in principle, prevent access to the first computer 3 by the second computer 1 via the Internet 5, access to the data on the first computer 3 is always activated from the first computer 3. In this case, connection setup by the first computer 3 is normally initiated by a local input from the operator, by virtue of a servicing button being pressed. In a further embodiment, connection setup from the first computer to the second computer 1 can also be initiated remotely at any time if the first computer 3 is equipped with a modem 7 and is connected to a telephone network 2. The modem 7 is configured such that it initiates connection setup from the first computer 3 to the second computer 1 when a particular bell signal arrives, but no data are transmitted via the telephone network 2, since the telephone connection is interrupted again after the bell signal is received. Using the bell signal, the accessing servicing personnel first identify themselves as being associated with the servicing company. In this case, the bell signal can be transmitted either by the servicing personnel computer 11 using a modem integrated in the computer 11 or via any other telephone whose telephone number is enabled as an authorizing bell signal for initiating the connection setup from the first computer 3 to the second computer 1. In line with the FIGURE, the bell signal can also be forwarded from a licensed mobile telephone 15 to the telephone network 2 via a mobile radio link 14 and a mobile radio station 12. Alternatively, the laptop 11 may also be equipped with a GSM mobile radio card as mobile radio modem, and can thus transmit the bell signal to the modem 7 in the computer 3 via the mobile radio link 14. Connection setup for transmitting data from the first computer 3 to the second computer 1 can thus be initiated only by telephone lines in the servicing company and not by unauthorized third parties. The second computer 1 is protected from the Internet 5 by a further firewall 10.

Before the servicing personnel can retrieve data from their computer 11, however, they first need to identify themselves on the computer 11 using software for a servicing portal. To this end, the personnel need to input at least their user name and an associated password. The invention demands a high level of authentication, which is characterized, by way of example, by the use of one-off passwords, which are generated by a token card. The laptop 11 may also have a fingerprint reader or a camera or iris recognition, in order to make identifying the servicing personnel secure against forgery. The data of the servicing personnel are stored on the second computer 1 in this case, which means that, in principle, any computer 11 which is connected to the second computer 1 and has the servicing portal software is able to perform identification and subsequent data requesting or access to the user interface.

If identification of the personnel is successful and the data retrieval via the telephone network 2 has been initiated successfully then first, before the actual data retrieval takes place, the personal data of the accessing servicing personnel are transmitted from the second computer 1 to the first computer 3 via the Internet 5. The screen 16 of the first computer 3 then shows at least the name of the servicing personnel, with a passport picture of the servicing personnel preferably also being displayed. The operator of the printing machine 9 is thus able to identify without any doubt which person currently wishes to access his computer 3. In a servicing agreement between the manufacturer and the operator of the printing machine 9, it is possible to arrange, by way of example, for just certain people to be permitted to service the printing machine 9. If the operator sees a person who is unknown to him or whom he does not want on the screen 16, he can use the keyboard on his computer 3 to prevent access to his data and his user interface and to reject the unwanted person. In addition, the inventive system can be programmed such that after the unwanted person has been rejected once a limited number of access attempts to the first computer 3 by this person is still possible. Alternatively, the servicing portal may also be programmed such that a person who has been rejected once is prevented from further access to the first computer 3 in future. Therefore, the operator of the printing machine 9 is always informed about which person currently wishes to access his computer 3, and is able to reject unwanted people.

This application claims the priority, under 35 U.S.C. §119, of German patent application No. 10 2004 022 215.0, filed May 4, 2004; the entire disclosure of the prior application is herewith incorporated by reference.

I claim:

1. An electronic system for secure and authorized access to data or a user interface, the electronic system comprising:
    at least one first computer for operating a machine and having the user interface;
    a display apparatus connected to said first computer;
    at least one second computer disposed at a location remote from said first computer and connected to said first computer, the data or the user interface connected to said first computer being accessed exclusively from said second computer, said second computer having an authorization device storing access data for personnel with access authorization, and that access to the data or said user interface on said first computer is preceded by said display apparatus connected to said first computer showing a display revealing the personnel and the access authorization provided from said second computer; and
    said first computer including a control element configured to be manually actuable at the first computer, after the display of the information from the second computer on the first computer, to reject access by the second computer to the data on the first computer.

2. The system according to claim 1, wherein said second computer and said first computer are connected to one another via an Internet.

3. The system according to claim 1, further comprising an intranet connecting said first computer to said second computer.

4. The system according to claim 1, wherein said display apparatus connected to said first computer displays a passport picture of the personnel upon identification.

5. The system according to claim 1, wherein personal data stored for the personnel cannot be altered by the personnel themselves.

6. The system according to claim 5, wherein the personnel data can be altered only with administrator access rights.

7. The system according to claim 1, wherein at least one of said first and second computers has a storage option for a period of data interchange between said first and second computers for logging a data interchange which is taking place.

8. The system according to claim 1, wherein the system is provided for data communication with a printing machine.

9. A method for secure and authorized access to data or a user interface of at least one first computer for an operating machine from at least one second computer, which comprises the steps of:
providing the second computer with a device for identifying authorized operating personnel;
providing a display apparatus connected to the first computer for showing a display revealing the authorized operating personnel having access authorization from the second computer;
providing a control element at the first computer, the control element configured to be manually actuable at the first computer, after the display of the information from the second computer on the first computer, to reject access by the second computer to the data on the first computer;
accessing the data or the user interface of the first computer exclusively from the second computer; and
the second computer being disposed at a location remote from the first computer.

10. The method according to claim 9, which further comprises allowing the second computer to access the data or the user interface of the first computer only if the first computer has enabled the access.

11. The method according to claim 9, which further comprises transmitting the data between the second computer and the first computer in encrypted form.

12. The method according to claim 10, which further comprises operating a control element of the first computer to reject access from the second computer to the data or the user interface on the first computer.

13. An electronic system for secure and authorized access to data or a user interface of at least one first computer for operating a machine from at least one second computer connected to the first computer, the electronic system comprising:
a display apparatus connected to the first computer;
an authorization device disposed in the second computer, said authorization device storing access data for personnel with access authorization, and that access to the data or the user interface on the first computer is preceded by said display apparatus connected to the first computer showing a display revealing the personnel and the access authorization provided from the second computer, the data or the user interface of the said first computer being accessed exclusively from the second computer, said second computer being disposed at a location remote from said first computer; and
said first computer including a control element configured to be manually actuable at the first computer, after the display of the information from the second computer on the first computer, to reject access by the second computer to the data on the first computer.

* * * * *